United States Patent [19]

Cain et al.

[11] Patent Number: 5,142,770
[45] Date of Patent: Sep. 1, 1992

[54] APPARATUS FOR PREDICTING TWIST OUT TORQUE IN A SWAGE MOUNT

[75] Inventors: Michael A. Cain, Oklahoma City; David S. Allsup, Norman, both of Okla.

[73] Assignee: Seagate Technology, Inc., Scotts Valley, Calif.

[21] Appl. No.: 788,950

[22] Filed: Nov. 7, 1991

Related U.S. Application Data

[62] Division of Ser. No. 509,469, Apr. 13, 1990, Pat. No. 5,097,584.

[51] Int. Cl.$^5$ .................. B25J 11/00; B23Q 17/00
[52] U.S. Cl. ........................... 29/705; 29/603
[58] Field of Search ............... 29/407, 505, 506, 507, 29/522.1, 523, 603, 705; 73/862.19, 862.27, 862.54

[56] References Cited

U.S. PATENT DOCUMENTS

| | | | |
|---|---|---|---|
| 922,096 | 5/1909 | Cunningham . | |
| 1,242,392 | 9/1917 | Underwood . | |
| 2,587,139 | 2/1952 | Glover | 29/253 |
| 3,735,163 | 5/1973 | Dijkstra et al. | 310/13 |
| 4,057,886 | 11/1977 | Brass | 29/235 |
| 4,135,416 | 1/1979 | Roux | 81/5.1 |
| 4,391,035 | 7/1983 | Van de Bult | 29/603 |
| 4,399,476 | 8/1983 | King | 360/104 |
| 4,433,463 | 2/1984 | DuVal | 29/239 |
| 4,587,587 | 5/1986 | Miller | 360/109 |
| 4,658,489 | 4/1987 | Johnston | 29/268 |
| 4,796,122 | 1/1989 | Levy et al. | 360/98.01 |
| 4,829,395 | 5/1989 | Coon et al. | 360/104 |
| 4,884,329 | 12/1989 | Higuchi | 29/407 |
| 4,947,666 | 8/1990 | Hametner et al. | 72/37 |

FOREIGN PATENT DOCUMENTS

| | | |
|---|---|---|
| 2730719 | 7/1977 | Fed. Rep. of Germany . |
| 2916696A | 4/1979 | Fed. Rep. of Germany . |
| 59-21866 | 12/1984 | Japan . |
| 2000893A | 1/1979 | United Kingdom . |
| 2020881A | 11/1979 | United Kingdom . |

OTHER PUBLICATIONS

IBM Technical Disclosure Bulletin; vol. 18, No. 1, Jun. 1975, Ball Staking of a Transducer Assembly Mounting Block to a Positioned Arm

*Primary Examiner*—Timothy V. Eley
*Attorney, Agent, or Firm*—Kinney & Lange

[57] ABSTRACT

An apparatus for predicting twist out torque of a swage mount measures work done by a swage ram during a swaging operation. The apparatus includes a position sensor for sensing the position of the ram and a force sensor for sensing the force of the ram during the swaging operation. The apparatus gathers position and force information and calculates swaging work. Swaging work correlates with twist-out torque for a swage mount. Calculated swaging work is compared with a minimum acceptable swaging work value which is related to a minimum acceptable twist out torque level. If the swage work of a particular swage mount is below the minimum acceptable swage work level, an operator can reswage the mount and thereby strengthen the mount to avoid future failure due to rotation at the swage mount.

12 Claims, 4 Drawing Sheets

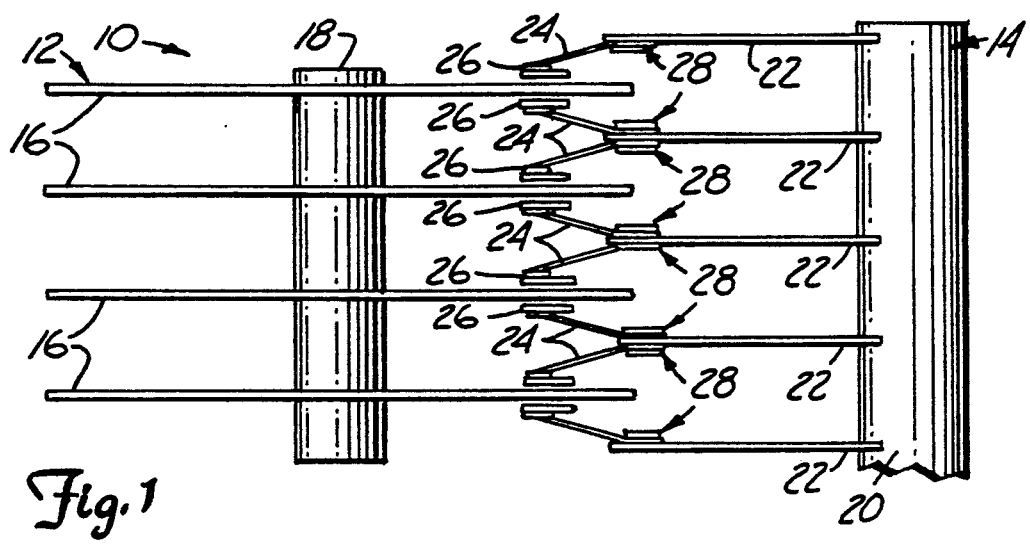
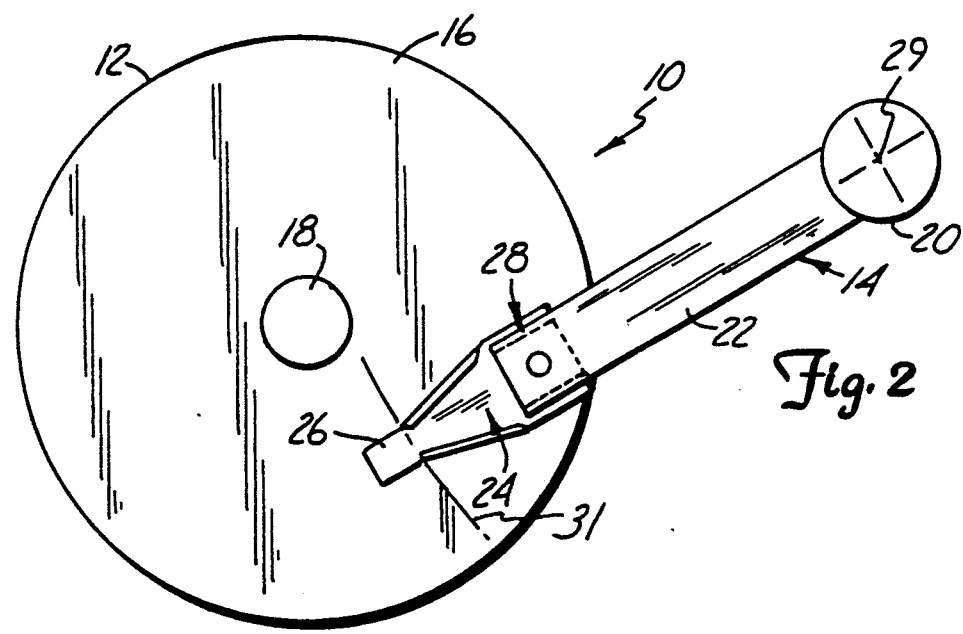
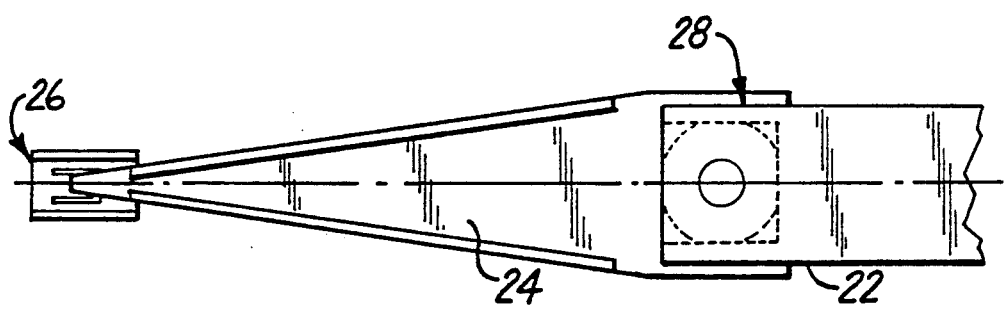

APPARATUS FOR PREDICTING TWIST OUT TORQUE IN A SWAGE MOUNT

This is a divisional of application Ser. No. 07/509,469, filed Apr. 13, 1990 now U.S. Pat. No. 5097584.

BACKGROUND OF THE INVENTION

The present invention relates to a swage mount used to attach a magnetic head carrying arm in a magnetic disk drive unit. In particular, the invention relates to a method and apparatus for predicting twist out torque in a swage mounted head gimbal assembly of a magnetic disk drive unit.

There has been a continual drive to increase the storage density in magnetic disk drive units. This has been achieved in part by stacking magnetic disks in a "pack" all carried within the same disk drive unit. Each side of each disk has its own associated magnetic head used for reading and writing information thereon. Each magnetic head has its own associated support arm which positions the head above the disk surface. By moving the arm, the magnetic head moves between tracks on the disk surface. A servomotor is connected to the support arm opposite the head. The magnetic head is moved between tracks by activating the servomotor whereby the support arm pivots and the magnetic head at the opposite tip of the arm is swung between adjacent tracks on the disk surface. A linear actuator may alternatively be used to move a magnetic head. A linear actuator moves the head inward or outward on the disk along a generally straight line.

To further increase space savings in the disk drive unit, a single servomotor typically controls all of the support arms and their associated magnetic heads. Thus, all of the support arms are connected together and pivot about the same pivot point. This configuration is identified as an "E-block" (which refers to the shape formed by the adjacent arms and the servomotor/pivot assembly).

A common method of connecting a magnetic head to a support arm is known as "swaging" or "ball staking." This mounting method requires less vertical space than other methods, allowing disks to be stacked closer together, thus increasing storage capacity. In swage mounting two pieces together, a hollow tube which extends from one piece is placed inside a hole in a second piece. A rounded shape (the "ball") is forced through the hollow tube which causes the metal tube to expand and lock the two pieces together.

After manufacture, forces on the magnetic head may cause the swage mount to "twist out." To ensure reliable disk drive units, manufacturers set twist out specifications for the swage mount which must be met by all disk drive units. Manufacturers use a twist out torque test to check swage mounts. The twist out torque test is a destructive test in which a torque is applied to a swage mount connecting the magnetic head to a support arm. The torque required to permanently rotate the head by 0.1° is measured. Since the twist out test is destructive, swage joints can only be tested on a sample basis. A low twist out torque indicates that the head might have rotated at a later time, causing the drive to fail. Furthermore, the testing procedure must be performed after the swage mount operation and cannot be performed in real time.

SUMMARY OF THE INVENTION

The present invention provides a method and apparatus for predicting twist out torque of a swage mount. The present invention provides predicted twist out torque measurements during the swaging operation. The technique provides a nondestructive method of predicting twist out torque.

In the present invention, a force sensor connects to a ram used to force the ball through the swage mount during the swaging operation. The force sensor provides an output representative of the swaging force of the ram. A displacement sensor senses the position of the ram. A computer gathers force and displacement information from the sensors through an analog-to-digital converter. The computer uses this information to calculate work done by the ram during the swaging operation. In an E-block assembly, the computer calculates swaging work for each swage mount. The work required during swaging correlates to the twist out torque of that swage mount. Work has been done to show the relationship of swage work to twist out torque. The measured work done by the ram during swaging is used by the computer to predict twist out force. If the predicted value falls below a predetermined minimum specified limit, the computer rejects that particular swage mount.

When a swage mount fails the test of the present invention, an operator can strengthen the mount by performing a second swaging operation using a larger diameter ball. The present invention increases yield during manufacturing by allowing the operator the opportunity to strengthen a below specification swage mount.

BRIEF DESCRIPTION OF THE DRAWINGS

FIG. 1 shows a disk pack and its associated E-block assembly.

FIG. 2 is a top view of a magnetic disk and magnetic head arm.

FIG. 3 is a top view of a magnetic head arm.

DETAILED DESCRIPTION OF THE PREFERRED EMBODIMENTS

Figure 4:
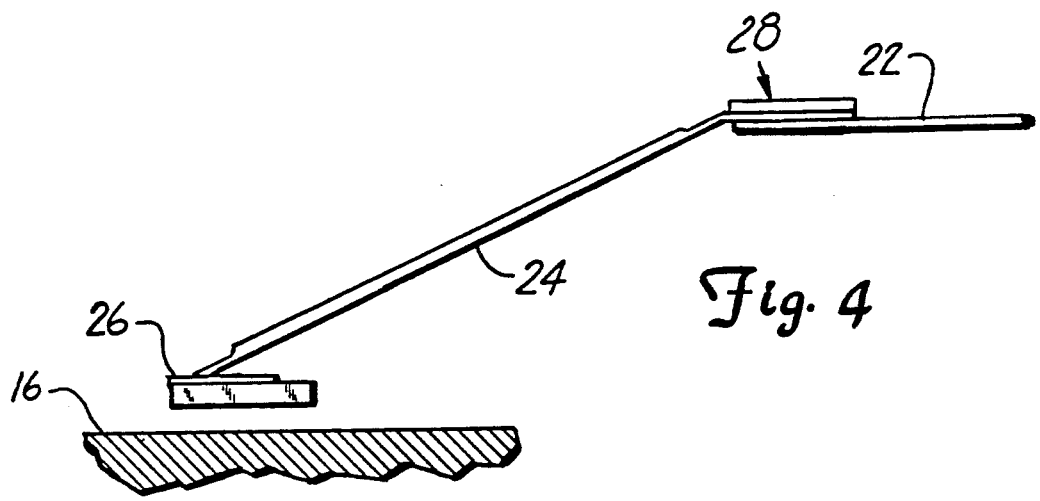
FIG. 4 is a side view of a magnetic head arm, a magnetic head assembly, and a magnetic disk surface.

FIG. 1 shows disk drive assembly 10 comprising a disk pack 12 and E-block assembly 14. Disk pack 12 comprises disks 16 stacked on a drive spindle 18. E-block assembly 14 comprises a servo spindle 20 and a plurality of support arms 22. Each support arm 22 carries one or two flexure arms 24. Each flexure arm 24 carries a magnetic head assembly 26. Each flexure arm 24 connects to its corresponding support arm 22 by a swage mount 28. The method of mounting swage mount 28 is explained below in more detail.

FIG. 2 shows a top view of disk drive assembly 10 of FIG. 1. Servo spindle 20 rotates around a pivot axis 29.

As servo spindle 20 rotates, magnetic head assembly 26 mounted at the tip of flexure arm 24 swings through arc 31. As disk 16 rotates adjacent to magnetic head 26, the pivoting motion of servo spindle 20 allows magnetic head assembly 26 to change track positions on disk 16. As shown in FIG. 1, as servo spindle 20 rotates, all magnetic head assemblies 26 move in unison.

FIGS. 3 and 4 show a more detailed diagram of flexure arm 24. Flexure arm 24 is spring loaded, so that magnetic head assembly 26 is held in close proximity to disk 16. As disk 16 rotates at high speed about drive spindle 18, the aerodynamic properties of magnetic head assembly 26 cause assembly 26 to "fly" with respect to the surface of disk 16. The flying height of magnetic head assembly 26 from disk 16 is a function of the speed of rotation of disk 16, the aerodynamic lift of magnetic head assembly 26 and the spring tension in flexure arm 24.

Figure 5:
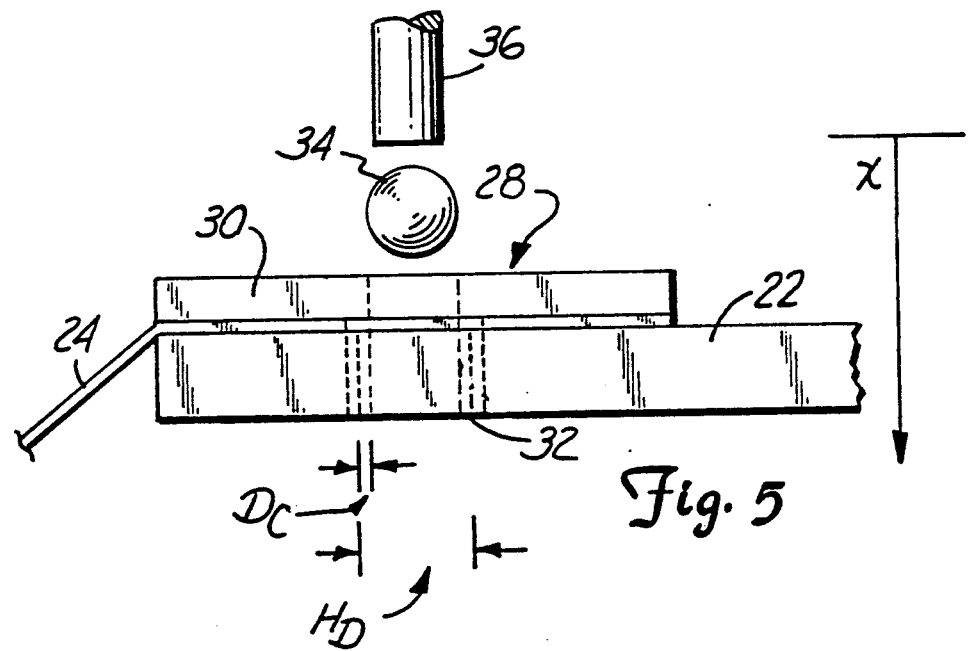
FIG. 5 is a side view of a swage mount for a magnetic disk support arm.

FIG. 5 is an enlarged view of a portion of FIG. 4 and shows a side view of a swage mount 28. Swage mount 28 comprises mounting plate 30 and tubular member 32. Tubular member 32 is hollow and comprises a malleable material such as a metal. Tubular member 32 extends through holes in flexure arm 24 and support arm 22. Flexure arm 24 connects to support arm 22 by placing support arm 22, flexure arm 24 and mounting plate 30 as shown in FIG. 5. Mounting plate 30 is connected to flexure arm 24 by a weld connection. Next, a ball 34 with a diameter larger than the inner diameter of tubular member 32 is forced through tubular member 22 by a ram 36 so that the material of tubular member 32 is compressed against the edges of the hole in support arm 22.

Figure 6:
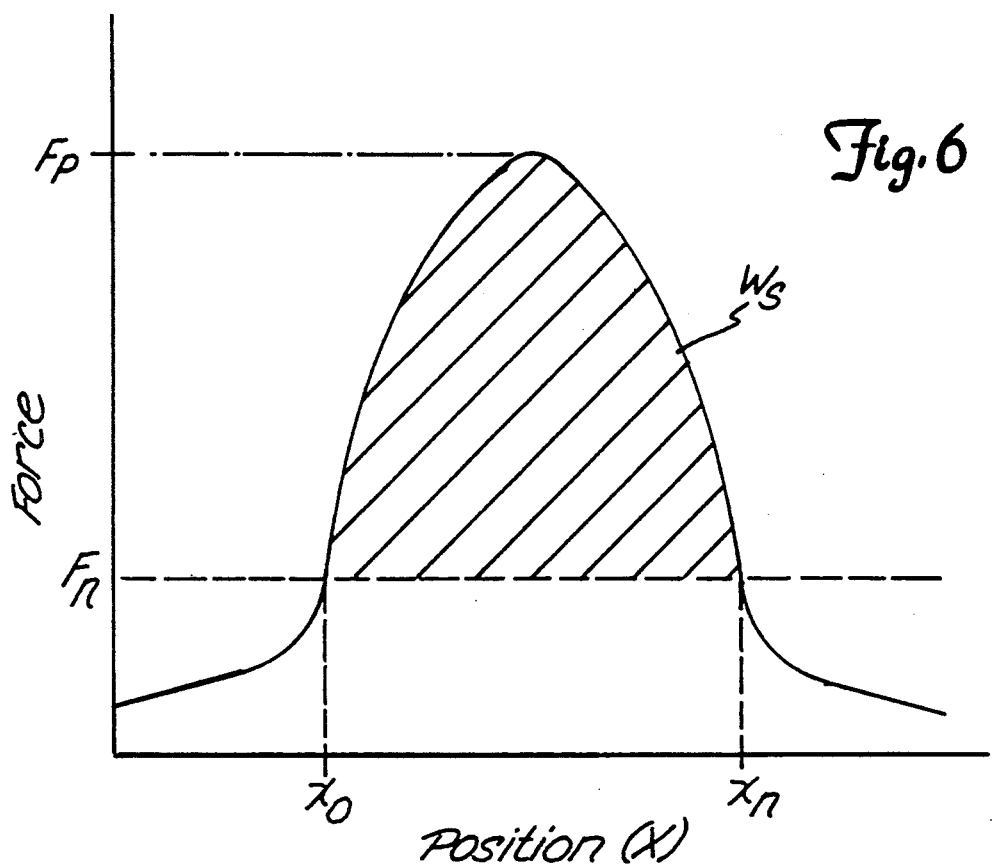
FIG. 6 is a graph of force versus position during a swaging operation.

FIG. 5 shows dimensions $D_C$ and $H_D$. $D_C$ is the clearance between the outer diameter of tubular member 32 and support arm 22. $H_D$ is the diameter of the holes in support arm 22. Therefore, $D_C$ is the difference between $H_D$ and the outer diameter of tubular member 32. X in FIG. 5 indicates the displacement of ram 36 and ball 34 during the swaging operation. As $D_C$ increases, the force from the ram necessary to swage mount decreases. FIGS. 6 is a typical graph of force versus position of a ram during a swaging operation. $F_n$ is a threshold force. $F_p$ is the peak force of the ram during a swaging operation. The hatched area under the curve labeled $W_s$ is the work performed by the ram during a swaging operation. $W_s$ is the work performed by the ram as the ram moves between a position of $X_o$ and $X_n$.

The work performed by a ram during the swaging operation can be calculated using the integral (equation 1):

$$W_s = \int_{X_0}^{X_n} (F(x) - F_n) \times dx$$

where:
  $F(x)$ = equals the force of the ram at any instant of position
  $X_o$ = equals the start position determined by the $F_n$ threshold
  $X_n$ = $X_n$ equals the end position determined by the $F_n$ threshold
  $F_n$ = $F_n$ equals the minimum force required before the start of integration. $F_n$ is a factor to reduce noise in the system.

In practice, this integration can be performed using a computer which implements a piece-wise integration in which the work is summed at small intervals using the equation (equation 2):

$$W_s \approx \sum_{m=X_0}^{X_n} (F_m - F_n) \times dx$$

Figure 7:
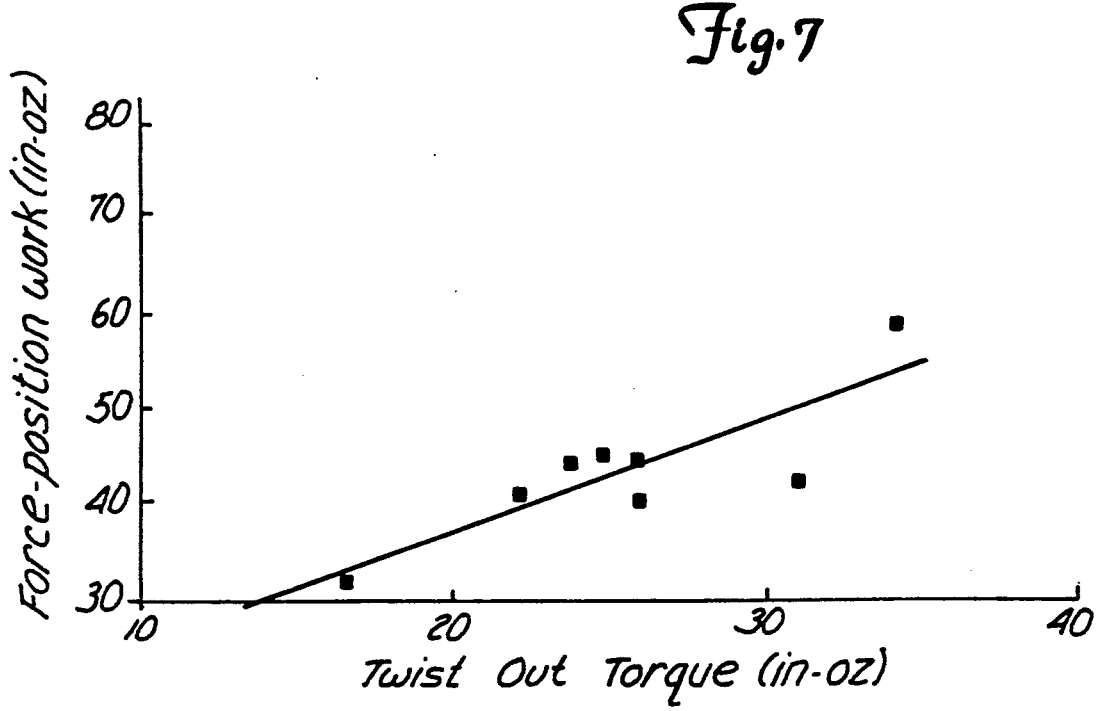
FIG. 7 is a graph which shows the correlation between work and twist out torque for swage mounts.

It has been discovered that the work performed by the swaging ball and ram during a swaging operation correlates with the twist out torque for that particular swage mount. Swaging work provides a better correlation with twist-out torque than peak or RMS force measurements. FIG. 7 comprises data points taken for swaging work using the present invention which are plotted against actual twist out torque measurements. As shown in FIG. 7, the correlation between swaging work and twist out torque can be approximated with a linear relationship.

Figure 8:
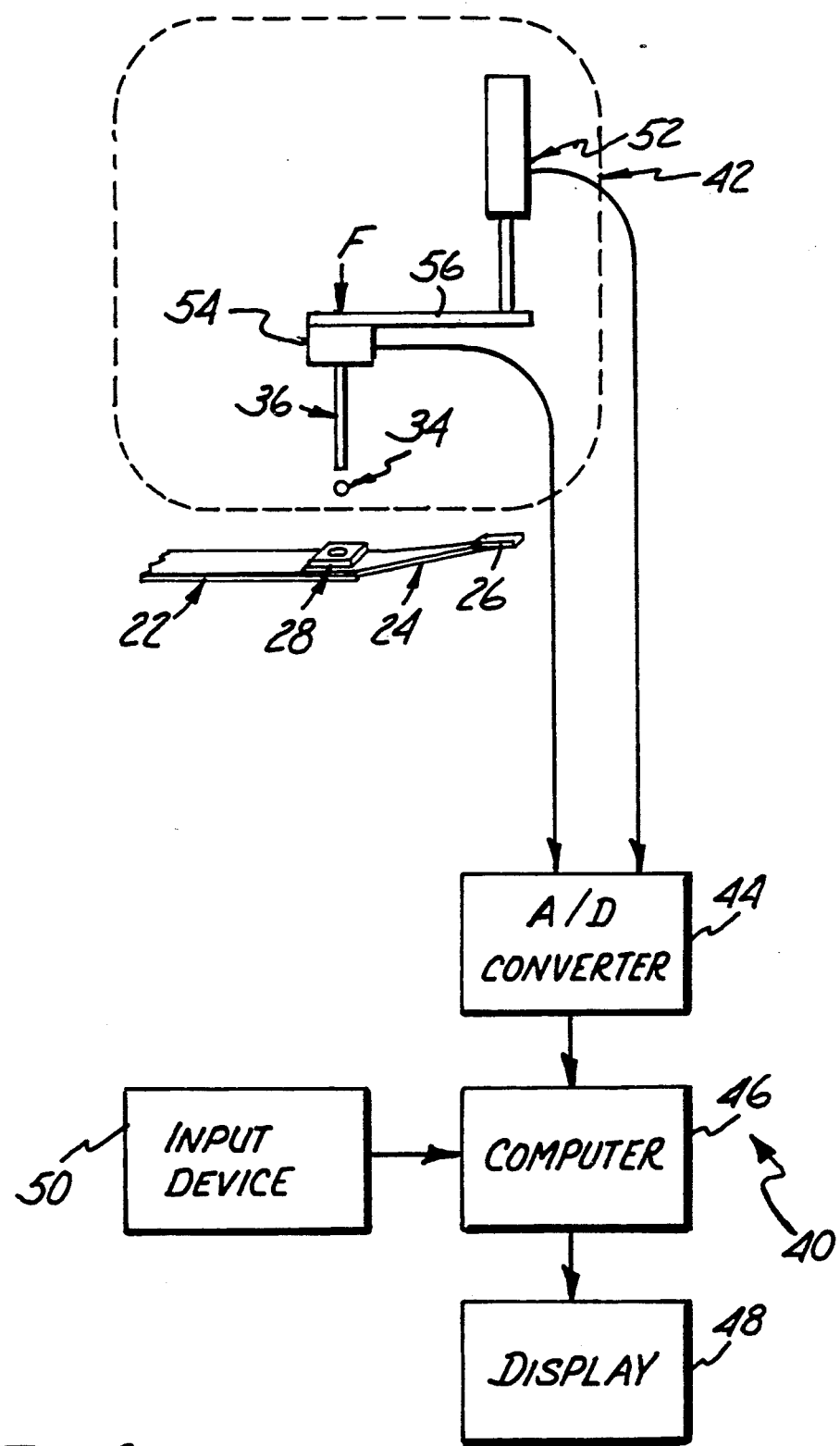
FIG. 8 is a block diagram of an apparatus for predicting twist out torque based upon work during a swaging operation, made in accordance with the present invention.

FIG. 8 shows a schematic diagram of an apparatus for measuring swaging work and predicting twist out torque in accordance with the present invention. A testing device 40 gathers force and position data and calculates swaging work. In FIG. 8 testing device 40 is shown relative to support arm 22 and flexure arm 24 undergoing the swaging operation. Testing device 40 includes a swaging and sensor assembly 42, analog to digital converter 44, computer 46, display 48 and input device 50. Swaging and sensor assembly 42 includes a position (or displacement) sensor 52 and a force sensor 54. During swaging, force is applied to ram 36 in the direction shown by the arrow labeled "F" in FIG. 8. Force sensor 54 detects the amount of force applied to ram 36, and displacement sensor 52 provides an output, representative of the displacement of ram 36, to an analog to digital converter 44. Position sensor 52 couples to ram 36 through a connecting piece 56.

Analog-to-digital converter 44 receives displacement and force information from sensors 52 and 54, respectively. Analog-to-digital converter 44 provides a digital output representative of displacement and force of the ram 36 during the swaging operation to computer 46. Computer 46 uses force and displacement data to calculate swaging work according to equation 2 when the force threshold level $F_n$ is exceeded. Computer 46 compares the calculated swaging work with a predetermined minimum acceptable value. The predetermined minimum acceptable value is calculated for the characteristics of the particular swage mount and the diameter of the swaging ball. The predetermined value is calculated, for example, using the correlation shown in FIG. 7 between swaging work and twist out torque. The predetermined minimum swaging work value should be set high enough that swage mounts fall well within twist out torque specifications. Display 48 informs the swaging operator of a below specification swage mount. Input device 50 can be used to initiate the testing process.

In response to the output of display 48, the swaging operator can re-swage a specific, subspecification swage mount using a larger diameter ball. Swaging with a larger diameter ball increases the strength of the swage mount and increases the twist out torque value. (Note: a large diameter swaging ball is not used in the initial swaging operation because a large diameter ball has a higher likelihood of damaging the mount and decreases the number of reswage opportunities.)

In a preferred embodiment, position sensor 52 is a linear variable differential transformer. Position sensor 52 provides a voltage output which varies linearly with displacement. Force sensor 54 is preferably a load cell which provides a voltage output which varies linearly with applied force.

Although the present invention has been described with reference to preferred embodiments, workers skilled in the art will recognize that changes may be made in form and detail without departing from the spirit and scope of the invention.

What is claimed is:

1. An apparatus for predicting twist-out torque of a spring loaded flexure arm and a support arm swage mounted together in a magnetic storage system in which the spring loaded flexure arm carries a magnetic head, comprising:
    a position sensor for sensing position and producing an output representative of swage position during a swaging operation in which the spring loaded flexure arm and the support arm are swage mounted together;
    a force sensor coupled to the position sensor for sensing swaging force and producing an output representative of swaging force during the swaging operation; and
    means connected to the position sensor and the force sensor for receiving the output representative of swage position and the output representative of swaging force and producing an output representative of swaging work over the swaging operation.

2. The apparatus of claim 1 including a means for comparing swaging work to a predetermined minimum acceptable swaging work and producing an output which indicates the relationship between the swaging work and the minimum acceptable swaging work.

3. The apparatus of claim 2 wherein the minimum acceptable swaging work is representative of a predetermined minimum twist out torque level.

4. The apparatus of claim 1 wherein the means for producing an output representative of swaging work comprises a computer.

5. The apparatus of claim 1 including an analog-to-digital converter connected to the position sensor and the force sensor for receiving the output representative of swage position and the output representative of swaging force and producing digital outputs.

6. The apparatus of claim 1 wherein the means for producing an output representative of swaging work, includes means for performing piece-wise integration of the output representative swaging force with respect to the output representative of swage position.

7. An apparatus for predicting twist-out torque of a flexure arm in a magnetic storage system, the flexure arm swage mounted to a support arm, the apparatus comprising:
    a swage for swage mounting the flexure arm to the support arm;
    a position sensor coupled to the swage for sensing swage position and producing an output representative of swage position during the swaging operation;
    a force sensor coupled to the swage for sensing swaging force exerted on the swage and producing an output representative of swaging force during the swaging operation; and
    means connected to the position sensor and the force sensor for receiving the output representative of swage position and the output representative of swaging force and producing an output representative of swaging work over the swaging operation.

8. The apparatus of claim 7 including a means for comparing swaging work to a predetermined minimum acceptable swaging work and producing an output which indicates the relationship between the swaging work and the minimum acceptable swaging work.

9. The apparatus of claim 8 wherein the minimum acceptable swaging work is representative of a predetermined minimum twist out torque level.

10. The apparatus of claim 7 wherein the means for producing an output representative of swaging work comprises a computer.

11. The apparatus of claim 7 including an analog-to-digital converter connected to the position sensor and the force sensor for receiving the output representative of swage position and the output representative of swaging force and producing digital outputs.

12. The apparatus of claim 7 wherein the means for producing an output representative for swaging work, includes means for performing piece-wise integration of the output representative swaging force with respect to the output representative of swage position.

* * * * *